Aug. 29, 1939.   H. BENDER   2,170,801
CHLORINATION
Filed April 15, 1935   2 Sheets-Sheet 2

INVENTOR
HARRY BENDER
BY Robert N. Eckhoff
ATTORNEY

UNITED STATES PATENT OFFICE 2,170,801

CHLORINATION

Harry Bender, Antioch, Calif., assignor, by mesne assignments, to The Dow Chemical Company, Midland, Mich., a corporation of Michigan Application April 15, 1935, Serial No. 16,285

11 Claims. (Cl. 260—662)

This invention relates to the manufacture in the gas phase of chemical compounds. In detail it relates to the manufacture of chlorinated methanes, particularly carbon tetrachloride, although it is applicable to other paraffins and to other compounds than paraffins which are halogenated in the gas phase by substitution or addition.

Methane, the first paraffin hydrocarbon, is relatively difficult to chlorinate; while the fact that it could be chlorinated by substitution has been known for quite some time, practical commercial operation has not been achieved. Bertholet performed the substitution in 1858. The United States Bureau of Mines (Tech. Paper 225, 1921) has performed the substitution on a small scale in glass and with a catalyst. I am able to carry on the substitution under commercial conditions without a catalyst and without any explosions or carbon depositing.

I have found that the formation of substituted methanes can be controlled and carried on under commercial conditions by reducing the factors affecting the reaction to the simplest number possible. Thus I do not use materials which, under the conditions of the reaction, are catalysts or provide catalytic surfaces, the reaction being carried out in the dark and without anything affecting the reaction other than the factors affecting the mass action equations, including the heating to reaction temperature in order to initiate the reaction. To provide these conditions I utilize carbon, graphite, carborundum and the like bodies as the reaction chambers. These I include in the term carbon body. In the manufacture of these, reference should be had to my copending applications Ser. No. 744,337 of September 17, 1934 (of which this is a continuation in part) and Ser. No. 11,251 of March 15, 1935, in which I claim the manufacture of such a body. These carbon bodies are preferably rendered of low porosity prior to use as is disclosed in said applications.

It is an object of this invention to provide for the commercial manufacture of carbon tetrachloride from methane and chlorine and other chlorinated methanes.

Another object is to provide a process for the chlorination of methane and like compounds which is of a simple nature, and easily controlled.

A further object is to provide a process for the vapor phase chlorination of materials which is of improved economy.

The invention possesses other objects and features of advantage some of which with the foregoing will appear hereinafter wherein a preferred method of practicing the invention is set forth.

Figure 3:
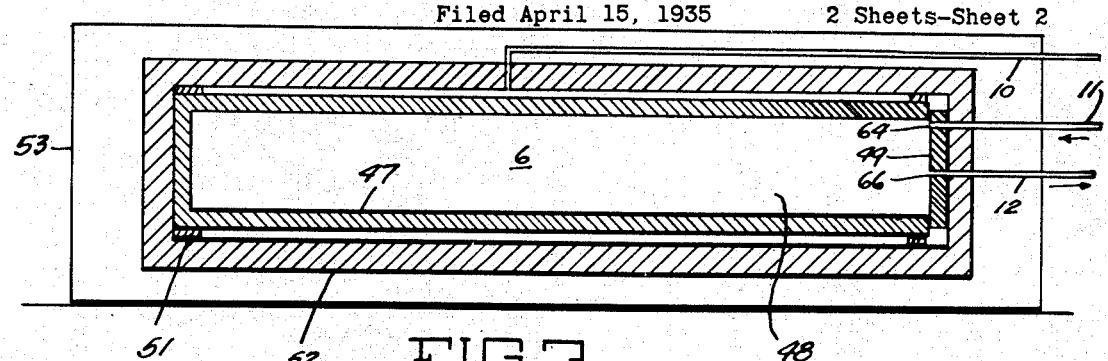
Figure 3 is a section through a reaction chamber.

Referring now to Figure 3, this represents a simple form of reaction chamber 6 provided by a "carbon body" cylinder 47. This body is preferably uniformly impregnated with a silicate to reduce porosity as is disclosed in my aforementioned applications. It contains mixing means indicated as 48, the body being closed by outlet cap 49. The reaction chamber and its cap are supported by spacers 51 in a metal shell 52. The shell is in turn supported in a chamber 53 which can be a furnace or other heat supply means or a cooling chamber, depending on the thermal character of the reaction practiced. With methane, a small amount of heat is necessary to compensate for insulation losses and to initiate reaction conditions of temperature.

In practice a mixture of methane and chlorine is passed in through inlet 54, the proportions being nearly molecular

$$CH_4 + 4Cl_2 \rightarrow CCl_4 + 4HCl.$$

The reaction chamber is maintained at about 360° C. for the above reaction while methane or other non-corrosive gas is supplied through conduit 10 to the space between the shell and the reaction chamber at a pressure slightly in excess of that on the inlet so that chlorine does not contact with the metal shell. The temperature at 360° C. for methane is relatively critical and good results are not obtained if the temperature varies more than 5° C. on either side of 360° C. during the initial stages of methane chlorination.

Figure 1:
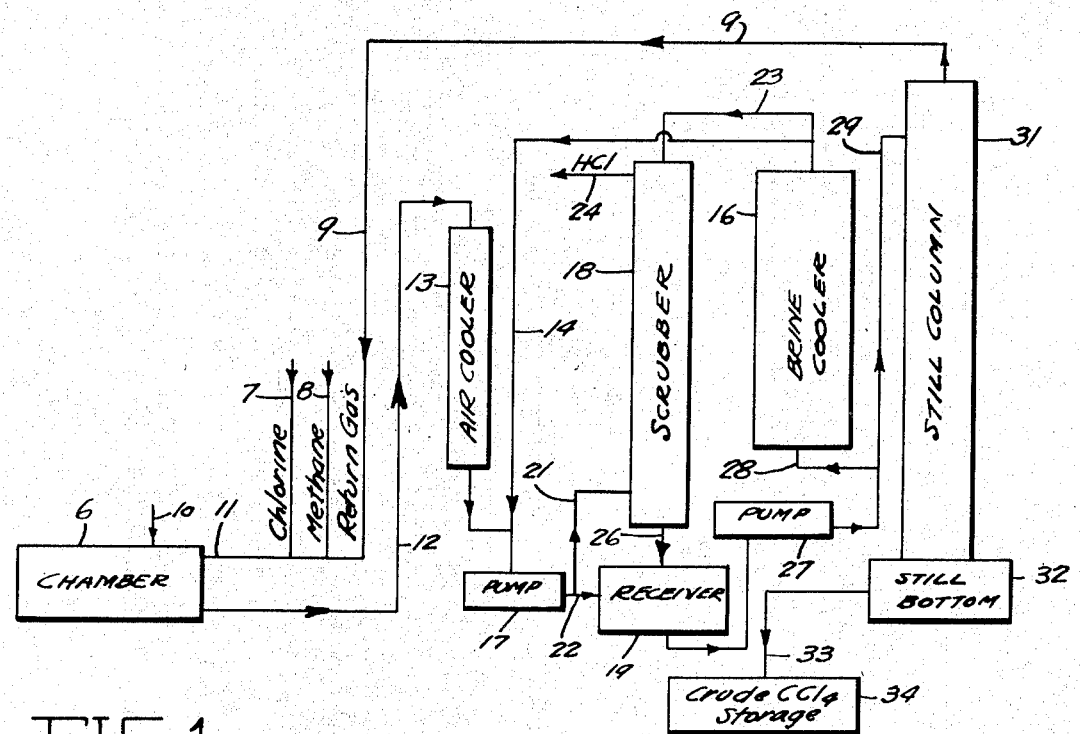
Figure 1 is a schematic showing of the apparatus and flow-sheet utilized.

In Figure 1 I have shown the preferred flow sheet and apparatus wherein such a chamber 6 is utilized. To this chamber gaseous chlorine, methane (with a very low ethane and oxygen content) and return gas are fed through pipes 7, 8 and 9 to inlet 11. The gases are reacted in the chamber and the outlet gas having a carbon tetrachloride content of about 50% is removed through pipe 12 to air cooler 13. The air cooled stream of HCl, chlorine, carbon tetrachloride and partially chlorinated methanes and unreacted original components is mixed with a cold stream of condensate carried by pipe 14 from brine cooler 16. This mixture is then forced by pump 17 into scrubber 18 and receiver 19, through pipes 21 and 22. In the scrubber the gases are further cooled by more cold condensate passed by pipe 23 from brine cooler 16 countercurrent to the gases, and unreacted chlorine is dissolved. The exit gas from this scrubber is largely HCl which is removed by pipe 24. The liquid from the scrubber 18 passes through outlet 26 into the receiver 19. From this receiver the condensate is forced by pump 27 partly into pipe 28 to the brine cooler and partly through pipe 29 to still column 31. In the still, the partially chlorinated methanes, chlorine and HCl are fractionated off to pipe 9. The crude carbon tetrachloride collects in the still bottom 32 (which includes a heating coil) and is withdrawn through pipe 33 to storage 34. The crude product is usually 90% carbon tetrachloride. Being produced in the absence of sulphur and water it is much more stable than carbon tetrachloride made from carbon bisulphide and does not present a stabilization problem of that accompanying carbon tetrachloride derived from carbon bisulphide in that it lacks any sulphur chloride content. The crude $CCl_4$ can be refined as by further distillation and treatment with chemicals. I contemplate the use of an active MgO to remove water traces and acid present.

Figure 2:
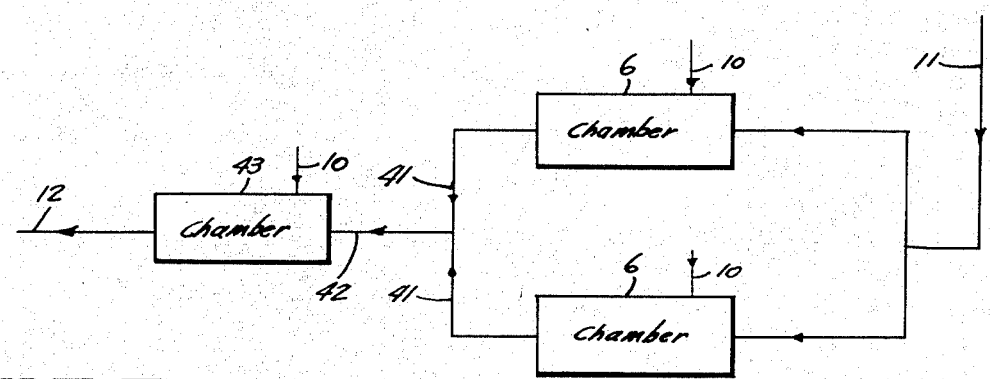
Figure 2 is a schematic view illustrating a reaction chamber hook-up.

I find by operating with excess chlorine, the reaction is much smoother and better results are secured. In some instances the use of multiple reaction chambers 6 is desirable and in Figure 2, I have shown a plurality of these connected to inlet 11 and having their outlets 41 connected by pipe 42 to each other and to a third chamber 43. This arrangement results in an increased capacity due to the possibility of operating the third chamber at a considerably higher temperature than the first two, the greater part of the heat of reaction having been dissipated in them. Thus the chamber 43 can be operated at a temperature 50°–75° C. higher than that temperature maintained in reaction chamber 6. Instead of running all chlorine through the first chambers only a part need be added (say three parts) and the remainder (one part) added to their combined exit gases before passage to 43.

Of course, by controlling the chlorine to methane ratio the end product can be varied. Thus, by passing in two and a half parts instead of four parts of chlorine and using a lower temperature I can secure a high chloroform yield. Also in chlorinating other materials lower temperatures can be used; ethane is chlorinated at about 250°, pentane at 170° C., and a high grade of gasoline at room temperature.

The operation in a carbon body enables the heat of reaction to be controlled to a nicety. Thus, the black body absorbs heat readily and, having a high specific heat, does not tend to overheat locally so that carbon builds up. With temperatures much higher than 400° C. the reaction

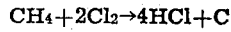
$CH_4 + 2Cl_2 \rightarrow 4HCl + C$ tends to go on and, when once started, continues to build up carbon locally. The reaction

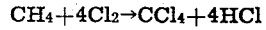
$CH_4 + 4Cl_2 \rightarrow CCl_4 + 4HCl$ is accompanied by a luminous flame or dull glow. The black body, having a high specific heat, absorbs any light and heat rapidly, thus tending to prevent self catalyzation of the reaction by generated light rays.

Figure 4:
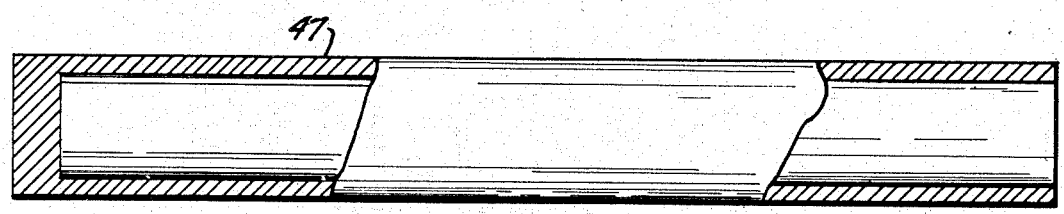
Figure 4 shows details of the mixing means in the reaction chamber.
Figure 4:
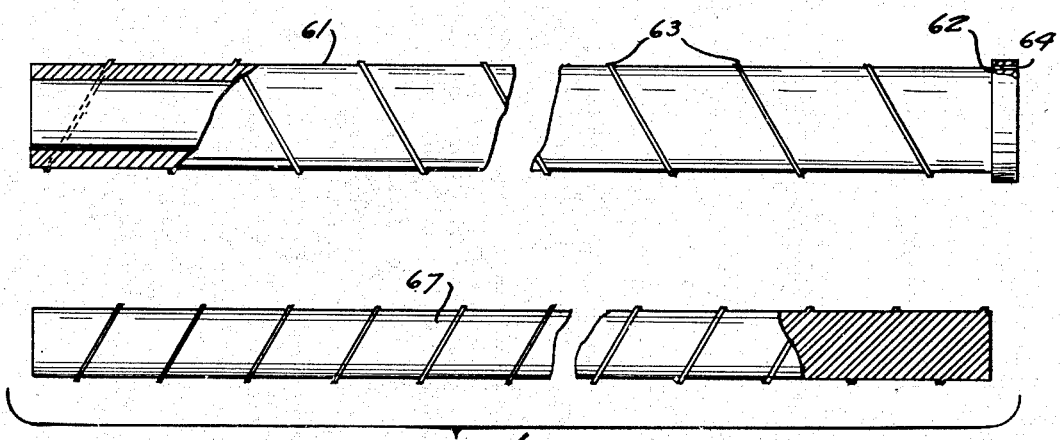

In Figure 4 I have shown details of the mixing means 48. These include a tube 61 insertable into cylinder 47 and having a head 62 thereon fitting against the cylinder. The tube has a screw thread 63 cut thereon to insure that the gases flow turbulently while reacting so that a uniform temperature can be maintained and localized over heating in the gases avoided. An inlet 64 and an outlet 66 are provided in the head. At the head end of the tube 61 the tube is spaced from the cylinder a very short distance, about one thirty-second of an inch while a three thirty-second space is allowed at the other end, the tube tapering from one end to the other. The thread touches the cylinder and causes the gases to flow turbulently between the two.

That the graphite surfaces be closely adjacent I have found critical. For example, if the surfaces be a sixteenth of an inch apart at the hot inlet end whereat the chlorine-methane mix enters, carbonization sets in, undesirably shortening the life of the equipment. I now believe that by having the surfaces closely adjacent, as I have previously indicated, a molecule of methane undergoing chlorination cannot travel very far before colliding with one of the closely adjacent graphite surfaces. This prevents it from activating too many other methane molecules so that the length of the chain reaction which a single activated molecule can set up is limited. As I have previously indicated herein, the problem in the substitution chlorination of methane and partially chlorinated methane is one of control—the reaction tends to go readily enough; the problem is to prevent it from going so rapidly that the methane cracks and deposits carbon with the undesirable formation of increased quantities of uneconomically produced hydrochloric acid. Of course, as the reaction mixture becomes diluted with a partially chlorinated methane, it is possible to have the graphite surfaces farther apart.

It is essential that tube 61 have very low if any porosity for I have found that, if tube 61 be porous, the methane passes through to the exit unreacted. The narrow space increasing gradually is also advantageous (though not an absolute essential) for it results in better heat control and less carbon formation. The tube 61 has a carbon body plug 67 inserted. This plug tapers from a clearance of one eighth inch to three sixteenths adjacent head 62 and outlet 66. It also carries a screw thread to cause turbulent flow.

It is to be noted that the reacting gases sweep between the carbon bodies in countercurrent so that the cold incoming gases are heated by the reaction and gases leaving. Heat control is thus facilitated. In chamber 43, the center plug can be omitted and the tube filled with chunks of carbon body so that an increased time of travel results as well as a low back pressure on chamber 6. The clean up of reacting gases is facilitated by an increase in pressure, time and temperature. Since the partially reacted gases have a lower heat generating potentiality, they can be run at a higher temperature and for a longer time without danger of carbonization. The space between adjacent graphite surfaces in the reactors handling diluted gases (such as the partially reacted gas entering chamber 43) can therefore be greater than in a reactor handling only unreacted chlorine and methane.

The use of partially chlorinated methanes as a diluent in the reaction is much more satisfactory than the use of steam or air for the methanes having been partially chlorinated enable the reaction to be pushed harder for their additional exothermic reaction heat is small relatively.

As a matter of fact, once chlorination has started it is generally easier to carry it through than to start with a partially chlorinated material; methane and chloroform chlorinate with about the same ease, methyl chloride is the easiest, then dichlor methane. By changing the chlorine to methane ratio the preponderance of the chlorinated methane to be manufactured can be varied. Thus, the process can be adjusted to prepare more chloroform or some other chlorinated methane. In many instances, adjusting the temperature will assist in this control.

The apparatus is particularly useful in the chlorination of methane although it can be used on other gases and in other reactions. The substitution chlorination reaction can be practiced on gaseous materials other than methane including ethane, propane and butane, aliphatic materials with less than five carbon atoms, as well as other gaseous materials, both aliphatic and aromatic including carbocyclic as well as heterocyclic materials.

To prevent corrosion of the equipment I preferably include a decomposition inhibitor. Since the natural gas used includes a small amount of oxygen, a small amount of water is formed.

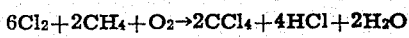

$$6Cl_2 + 2CH_4 + O_2 \rightarrow 2CCl_4 + 4HCl + 2H_2O$$

To prevent acid corrosion, a small quantity of an organic base is included, particularly in that portion of the system wherein the material is nearly free of HCl. The base added preferably has a boiling point close to that of carbon tetrachloride, or the chlorinated methane present in greatest quantity, so that the base carries over with the chlorinated methane and protects the equipment in both the liquid and vapor phase. With carbon tetrachloride I use butyl amine (B. P. 78° C.), but other bases can be used as acetyl cyanide, allyl amine, amyl amine, aniline, benzyl azide, benzyl amine, butyl secondary amine, diethyl amine, dipropyl amine, ethyl amine, ethyl hydrazine, ethyl hydroxyl amine, et cetera. The base is added to line 12 so that the protection is afforded the equipment throughout its extent. If a base having a boiling point close to that of the products it will condense with them and afford both liquid and vapor phase protection.

The material used as an inhibitor is preferably one including basic nitrogen, including a C to N linkage or the double nitrogen linkage as in the azo compounds. More particularly amines, amides, imides, hydrazines, hydrazides and cyanides can be used, both aliphatic and cyclic.

I claim:

1. A process for substituting chlorine for hydrogen in methane without formation of free carbon comprising passing a mixture including gaseous methane and chlorine through an elongated channel between two graphite surfaces substantially free of metals and maintaining one of said surfaces at a temperature of about 360° C., said surfaces being only about $\frac{1}{32}$ of an inch apart to prevent ignition of said hydrocarbon.

2. A process for substituting chlorine for hydrogen in methane without formation of free carbon comprising passing a mixture including gaseous methane and chlorine through a reaction space bounded by graphite surfaces substantially free of metals, while maintaining at least one of said surfaces at a temperature of about 360° C., said surfaces being only about $\frac{1}{32}$ of an inch apart to prevent ignition of said hydrocarbon.

3. A process for substituting chlorine for hydrogen in methane without formation of free carbon comprising passing a mixture including gaseous methane, partially chlorinated methane and chlorine through an elongated channel between two graphite surfaces substantially free of metals and maintaining one of said surfaces at a temperature of about 360° C., said surfaces being only about $\frac{1}{32}$ of an inch apart to prevent ignition of said hydrocarbon.

4. A process for substituting chlorine for hydrogen in methane without formation of free carbon comprising passing a mixture including gaseous methane, partially chlorinated methane and chlorine through a reaction space bounded by graphite surfaces substantially free of metals, while maintaining at least one of said surfaces at a temperature of about 360° C., said surfaces being only about $\frac{1}{32}$ of an inch apart to prevent ignition of said hydrocarbon.

5. In a process of substitution chlorination of methane or a partially chlorinated methane, the step of reacting at about 360° C. the methane with chlorine by passing the methane mixed with chlorine in substantially stoichiometrical volumes through an elongated channel provided by graphite surfaces substantially free of metals and only about $\frac{1}{32}$ of an inch apart.

6. A process for substituting chlorine for hydrogen in a saturated aliphatic hydrocarbon of less than five carbon atoms comprising passing a gaseous mixture of the hydrocarbon and chlorine through an elongated continuous channel between two substantially parallel and smooth graphite surfaces while maintaining at least one of said surfaces at a temperature conducive to substitution chlorination of said hydrocarbon e. g. about 360° C. for methane, about 250° C. for ethane, and about room temperature for a high grade of gasoline, said surfaces being only about $\frac{1}{32}$ of an inch apart to prevent ignition of said hydrocarbon.

7. A process for substituting chlorine for hydrogen in a saturated aliphatic material of less than five carbon atoms comprising passing a gaseous mixture of the material and chlorine through an elongated continuous channel between two substantially parallel and smooth graphite surfaces while maintaining at least one of said surfaces at a temperature conducive to substitution chlorination of said material, e. g. about 360° C. for methane, about 250° C. for ethane, and about room temperature for a high grade of gasoline, said surfaces being only about $\frac{1}{32}$ of an inch apart to prevent ignition of said hydrocarbon.

8. A process for chlorinating methane comprising subjecting a chlorine-methane mixture to a temperature whereat methane ignition can occur and confining said mixture between smooth substantially parallel walls to prevent substantially entirely carbon formation in said mixture, said surfaces being only about $\frac{1}{32}$ of an inch apart to prevent ignition of said hydrocarbon.

9. A process for chlorinating methane comprising subjecting a chlorine-methane mixture to a temperature whereat methane ignition can occur and confining said mixture between smooth substantially parallel carbon body walls to prevent substantially entirely carbon formation in said mixture, said surfaces being only about $\frac{1}{32}$ of an inch apart to prevent ignition of said hydrocarbon.

10. A process for chlorinating methane comprising subjecting a chlorine-methane mixture to a temperature capable of inducing such vigorous reaction of chlorine and methane that usually ignition of methane occurs to form C and HCl and suppressing said ignition substantially entirely in favor of chlorination of said methane by confining said mixture between substantially smooth parallel walls, said walls being maintained substantially only a thirty second of an inch apart as to suppress substantially entirely said ignition during existence of said condition.

11. A process for chlorinating methane comprising subjecting a chlorine-methane mixture to a condition capable of inducing such vigorous reaction of chlorine and methane that usually ignition of methane occurs to form C and HCl and suppressing said ignition substantially entirely in favor of chlorination of said methane by confining said mixture between substantially smooth parallel walls maintained substantially only a thirty second of an inch apart as to suppress substantially entirely said ignition during existence of said condition.

HARRY BENDER.